(12) United States Patent
Xu et al.

(10) Patent No.: US 12,107,520 B2
(45) Date of Patent: Oct. 1, 2024

(54) DRIVING CIRCUIT AND DRIVING METHOD

(71) Applicant: Silergy Semiconductor Technology (Hangzhou) LTD, Zhejiang (CN)

(72) Inventors: Zhiwei Xu, Hangzhou (CN); Chiqing Fang, Hangzhou (CN); Yunlong Han, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 606 days.

(21) Appl. No.: 17/356,028

(22) Filed: Jun. 23, 2021

(65) Prior Publication Data
US 2022/0006398 A1 Jan. 6, 2022

(30) Foreign Application Priority Data
Jul. 1, 2020 (CN) .......................... 202010616781.2

(51) Int. Cl.
*H02M 3/158* (2006.01)
*H02M 3/155* (2006.01)
*H02N 2/06* (2006.01)

(52) U.S. Cl.
CPC .............. *H02N 2/06* (2013.01); *H02M 3/155* (2013.01)

(58) Field of Classification Search
CPC .................................. H02N 2/06; H02M 1/14
See application file for complete search history.

(56) References Cited

U.S. PATENT DOCUMENTS

| | | | |
|---|---|---|---|
| 6,703,762 B1 | 3/2004 | Okada | |
| 2002/0117939 A1* | 8/2002 | Kawamoto | ........ F02M 63/0026 310/316.03 |
| 2008/0088262 A1* | 4/2008 | Bolz | ................... F02D 41/2096 318/116 |
| 2019/0331046 A1* | 10/2019 | Katzenburger | ..... F02D 41/2096 |

FOREIGN PATENT DOCUMENTS

CN 202867012 U 4/2013

* cited by examiner

*Primary Examiner* — Kawing Chan
*Assistant Examiner* — Charles S Laughlin

(57) ABSTRACT

A driving circuit for driving a piezoelectric load, can include: an energy-storage capacitor; a first power stage circuit configured to convert an input voltage into a first voltage, and to store the first voltage in the energy-storage capacitor; a second power stage circuit configured to receive the first voltage to charge the piezoelectric load during a first operation interval of an operation period, such that a power supply voltage signal provided to the piezoelectric load in the first operation interval corresponds to a reference voltage in a first interval; and a discharging circuit configured to discharge the piezoelectric load during a second operation interval of the operation period, such that the power supply voltage signal in the second operation interval corresponds to the reference voltage in a second interval.

19 Claims, 11 Drawing Sheets

DRIVING CIRCUIT AND DRIVING METHOD

RELATED APPLICATIONS

This application claims the benefit of Chinese Patent Application No. 202010616781.2, filed on Jul. 1, 2020, which is incorporated herein by reference in its entirety.

FIELD OF THE INVENTION

The present invention generally relates to the field of power electronics, and more particularly to driving circuits and methods for driving a piezoelectric load.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
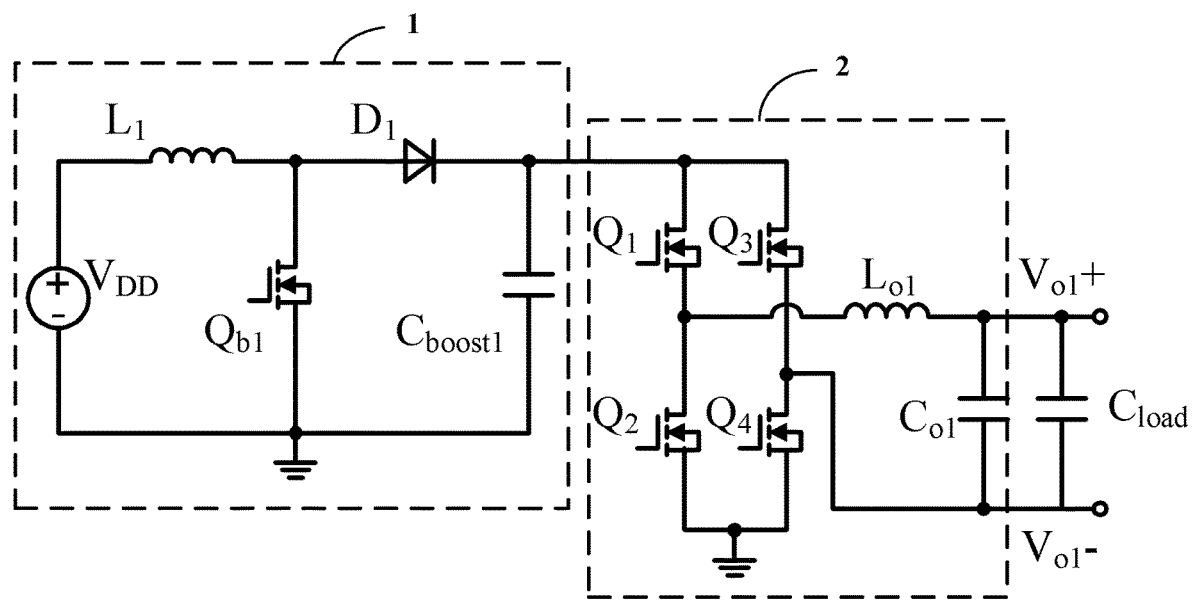
FIG. 1 is a schematic diagram of an example driving circuit.

As a piezoelectric load or a piezoelectric actuator, a piezoelectric ceramic is increasingly widely used. One example driving circuit for driving the piezoelectric ceramic is as shown in FIG. 1. This example driving circuit can include boost circuit 1 and full-bridge inverter circuit 2. Boost circuit 1 can convert input voltage VDD. Full-bridge inverter circuit 2 can convert direct current electricity output from boost circuit 1 into alternating current electricity, in order to drive piezoelectric ceramic $C_{load}$. This example driving circuit may require a large number of switches when driving one piezoelectric ceramic, and more switches when driving multiple piezoelectric ceramics coupled to respective full-bridge inverter circuits 2, which may not accommodate circuit integration.

In particular embodiments, a driving circuit is configured to drive a piezoelectric load. The driving circuit can include an energy-storage capacitor, a first power stage circuit, a second power stage circuit, and a discharging circuit. The first power stage circuit can convert an input voltage into a first voltage, and may store the first voltage in the energy-storage capacitor. During a first operation interval of an operation period, the second power stage circuit may receive the first voltage to charge the piezoelectric load, such that a power supply voltage signal provided to the piezoelectric load in the first operation interval corresponds to a reference voltage in a first interval. During a second operation interval of the operation period, the discharging circuit may discharge the piezoelectric load, such that the power supply voltage signal in the second operation interval corresponds to the reference voltage in a second interval. The first power stage circuit and the second power stage circuit of particular embodiments may operate independently and not interfere with each other. In addition, the voltage on the energy-storage capacitor may become the first voltage after being stabilized.

The first power stage circuit can be configured as a power stage circuit with a boost function, and the second power stage circuit may be configured as a power stage circuit with a boost function. The driving circuit can also include N voltage output circuits to drive N piezoelectric loads, respectively. The N voltage output circuits can connect in parallel with each other, and each of the N voltage output circuits can include a selection switch. The selection switch can connect in series with the corresponding piezoelectric load driven by the corresponding voltage output circuit. The corresponding voltage output circuit can be switched on or off by controlling the switching states of the selection switch, then the piezoelectric load can accordingly be driven or not driven, where N is a positive integer.

The discharging circuit can include a charge pump, and a discharging switch or a branch formed by multiple discharging switches connected in parallel with each other, such that the piezoelectric load discharges electricity through the discharging circuit. When multiple piezoelectric loads are driven by one driving circuit, the discharging circuit may be required to bear a relatively large discharging current. The discharging circuit including multiple discharging switches connected in parallel with each other may have relatively low requirements for the switches. For example, the discharging circuit can include one discharging switch.

The reference voltage in the first interval can be a rising part of the reference voltage increasing from a first threshold to its maximum value within a period, and the reference voltage in the second interval may be a falling part of the reference voltage within the period. For example, the first threshold is a minimum value of the reference voltage or a minimum value of an output voltage of the second power stage circuit. In one example, the waveform of the reference voltage can be a sine wave with a trough value not less than zero. The waveform of the reference voltage can be obtained by shifting a standard sine wave upward such that the trough value is greater than or equal to 0. In another example, the waveform of the reference voltage can be a rectified sine wave. In other examples, the reference voltage may be in other forms, as long as the value of the reference voltage is not less than zero. As described herein, the waveform of the reference voltage is exemplified as a sine wave with a trough value not less than zero as an example.

Figure 2:
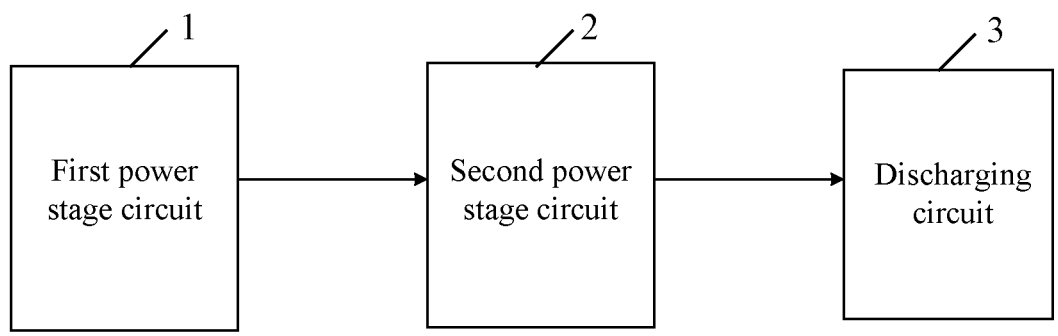
FIG. 2 is a block diagram of an example of a first type of a driving circuit, in accordance with embodiments of the present invention.

Referring now to FIG. 2, shown is a block diagram of an example of a first type of a driving circuit, in accordance with embodiments of the present invention. In this particular example, the driving circuit used to drive a piezoelectric load can include an energy-storage capacitor (not shown in FIG. 2), power stage circuit 1, power stage circuit 2, and discharging circuit 3. Power stage circuit 1 can convert an input voltage into a first voltage, and store the first voltage in the energy-storage capacitor. During a first operation interval of an operation period, power stage circuit 2 may receive a first voltage to charge the piezoelectric load, such that a power supply voltage signal provided to the piezoelectric load in the first operation interval corresponds to a reference voltage in a first interval. During a second operation interval of the operation period, discharging circuit 3 may discharge the piezoelectric load, so that the power supply voltage signal in the second operation interval corresponds to the reference voltage in a second interval.

During the first operation interval, discharging circuit 3 can be controlled to be cut off, and power stage circuit 2 may be controlled to operate such that the power supply voltage signal corresponds to the reference voltage in the first interval. During the second operation interval, power stage circuit 2 can be controlled to be cut off and discharging circuit 3 may be controlled to operate so that the power supply voltage signal corresponds to the reference voltage in the second interval. For example, during the first operation interval, discharging circuit 3 can be controlled to be cut off, and power stage circuit 2 may be controlled to operate in a pulse-width modulation (PWM) control mode, in order to charge the piezoelectric load. During the second operation interval, power stage circuit 2 can be controlled to be cut off, and discharging circuit 3 may be controlled to operate in a PWM control mode, in order to discharge the piezoelectric load. During the first operation interval, the duty cycles of switches in power stage circuit 2 can be controlled to adjust the power supply voltage signal to change along with the reference voltage in the first interval. During the second operation interval, the duty cycles of switches in discharging circuit 3 can be controlled to adjust the power supply voltage signal to change with the reference voltage in the second interval.

The reference voltage in the first interval may be a rising part of the reference voltage within a period, and the reference voltage in the second interval may be a falling part of the reference voltage within the period. When the minimum value of the output voltage of power stage circuit 2 is greater than the minimum value of the reference voltage, the power supply voltage signal provided by the first type of the driving circuit to the piezoelectric load may not track the reference voltage during an interval where the reference voltage rises from its minimum value to the minimum value of the output voltage of power stage circuit 2, which can increase the total harmonic distortion of the power supply voltage signal. In order to reduce the total harmonic distortion, particular embodiments provide a second type of the driving circuit, as shown in FIG. 3.

In addition, the first type of driving circuit in FIG. 2 may be suitable for power stage circuit 2 with any output voltage. When the minimum value of the output voltage of power stage circuit 2 is not greater than the minimum value of the reference voltage, the power supply voltage signal provided by the first type of the driving circuit can track the reference voltage in the all rising part of the reference voltage, and the total harmonic distortion of the power supply voltage signal can be relatively small. However, the first type of the driving circuit can also be applied whereby the minimum value of the output voltage of power stage circuit 2 is greater than the minimum value of the reference voltage.

Figure 3:
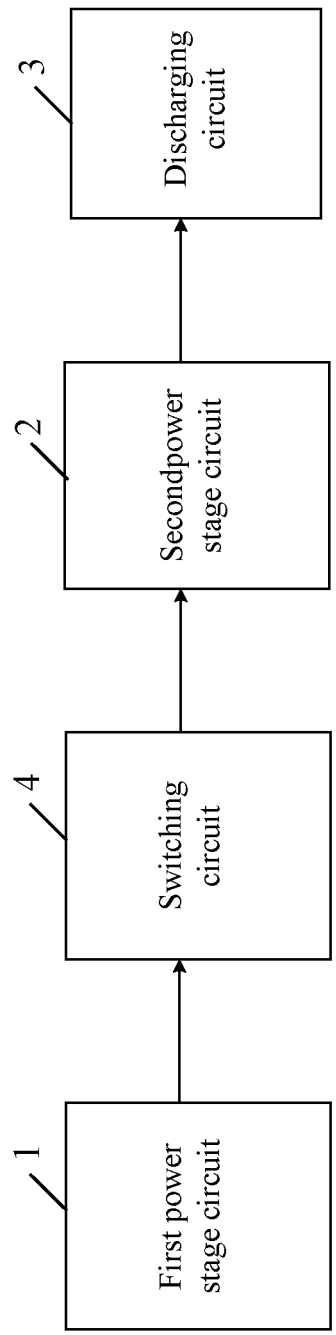
FIG. 3 is a block diagram of an example of a second type of a driving circuit, in accordance with embodiments of the present invention.

Referring now to FIG. 3, shown is a block diagram of an example of a second type of a driving circuit, in accordance with embodiments of the present invention. In this particular example, the minimum value of the output voltage of power stage circuit 2 can be greater than the minimum value of the reference voltage. The second type of the driving circuit in FIG. 3 may be different from the first type of the driving circuit in FIG. 2 in that the second type of the driving circuit can also include switching circuit 4 coupled between the energy-storage capacitor and power stage circuit 2. Also, during a third operation interval of the operation period, switching circuit 4 may receive a first voltage to charge the piezoelectric load, such that the power supply voltage signal in the third operation interval corresponds to the reference voltage in a third interval. Optionally, switching circuit 4 can include a switch coupled between the energy-storage capacitor and power stage circuit 2.

Further, during the third operation interval and the first operation interval, discharging circuit 3 can be controlled to be cut off, and switching circuit 4 and power stage circuit 2 may be controlled to operate, such that the power supply voltage signal corresponds to the reference voltage in the third interval and the first interval. During the second operation interval, both switching circuit 4 and power stage circuit 2 can be controlled to be cut off, and discharging circuit 3 may be controlled to operate, such that the power supply voltage signal corresponds to the reference voltage in the second interval. Further, during the third operation interval, switching circuit 4 can be controlled to operate in a linear adjustment mode to charge the piezoelectric load, such that the power supply voltage signal corresponds to the reference voltage in the third interval. During the first operation interval, switching circuit 4 can be controlled to operate in a fully conductive state, and power stage circuit 2 may be controlled to operate, such that the power supply voltage signal corresponds to the reference voltage in the first interval.

For example, during the third operation interval, power stage circuit 2 may not operate in a PWM control mode. In one example, some of the switches in power stage circuit 2 can be controlled to be turned on to transmit energy to the piezoelectric load. In another example, power stage circuit 2 can be controlled to be cut off. During the third operation interval, discharging circuit 3 can be controlled to be cut off, and switching circuit 4 may be controlled to operate in the linear adjustment mode. Also, switching circuit 4 may receive the first voltage and charges the piezoelectric load through some components of power stage circuit 2, such that the power supply voltage signal corresponds to the reference voltage in a third interval. During the first operation interval, switching circuit 4 can be controlled to operate in the fully conductive state, discharging circuit 3 may be controlled to be cut off, and power stage circuit 2 can be controlled to operate in a PWM control mode, such that the power supply voltage signal corresponds to the reference voltage in the first interval. During the second operation interval, both switching circuit 4 and power stage circuit 2 can be controlled to be cut off, and discharging circuit 3 may be controlled to operate in a PWM control mode, such that the power supply voltage signal corresponds to the reference voltage in the second interval.

During the third operation interval, the on-resistance of switching circuit 4 can be controlled to adjust the power supply voltage signal to change along with the reference voltage in the third interval. During the first operation interval, the duty cycles of switches in power stage circuit 2 may be controlled to adjust the power supply voltage signal to change with the reference voltage in the first interval. Also, during the second operation interval, the duty cycles of switches in discharging circuit 3 can be controlled to adjust the power supply voltage signal to change with the reference voltage in the second interval.

The minimum value of the output voltage of second power stage circuit 2 in the second type of the driving circuit in FIG. 3 can be greater than the minimum value of the reference voltage, such the reference voltage in the third interval is a rising part of the reference voltage increasing from its minimum value to the minimum value of the output voltage of power stage circuit 2 within a period. The reference voltage in the first interval can be a rising part of the reference voltage increasing from the minimum value of the output voltage of power stage circuit 2 to its maximum value within the period, and the reference voltage in the second interval may be the falling part of the reference voltage within the period. As such, when the minimum value of the output voltage of power stage circuit 2 is not greater than the minimum value of the reference voltage, the third interval may not occur, and switching circuit 4 may not be needed. Thus, the second type of the driving circuit can be aimed at a case whereby the minimum value of the output voltage of power stage circuit 2 is greater than the minimum value of the reference voltage. In particular embodiments, the minimum value of the reference voltage can be equal to or greater than zero. As described herein, the waveform of the reference voltage is exemplified as a sine wave with a trough value equal to zero.

In particular embodiments, the driving circuit of the present invention may utilize two power stage circuits and a discharging circuit to charge or discharge the piezoelectric load, in order to adjust the power supply voltage signal provided to the piezoelectric load to change with the reference voltage, such that the power supply voltage signal in the first operation interval corresponds to the reference voltage in the first interval, and the power supply voltage signal in the second operation interval corresponds to the reference voltage in the second interval. The control principle of the driving circuit can be controlling the operation states of the two power stage circuits and the discharging circuit according to the reference voltage, such that the power supply voltage signal follows the reference voltage.

In particular embodiments, the driving circuit may utilize two power stage circuits. The first power stage circuit can be used to boost the input voltage and provide the boosted voltage to the second power stage circuit, such that the input voltage of the second power stage circuit is larger and the input current of the second power stage circuit is smaller. Therefore, the second power stage circuit may utilize low-current and high-voltage switches (e.g., low-current switches with large on-resistance), and the first power stage circuit may utilize low-voltage switches. When only one power stage circuit is used to charge the piezoelectric load, the input voltage of the power stage circuit can be relatively small, and the input current of the second power stage circuit may be relatively large, such that the power stage circuit may be required to use high-current and high-voltage switches. The area of the low-current and high-voltage switch in particular embodiments is much smaller than that of the high-current and high-voltage switch. Therefore, compared with approaches that only use one power stage circuit, particular embodiments using two power stage circuits may substantially the area of high-voltage switches, improve the power density of the driving circuit, and avoid use of floating high-voltage switches.

Further, on the basis of two power stage circuits, the driving circuit can be divided into two categories in certain embodiments. One operation period of the first type of the driving circuit can include two operation intervals. During the first operation interval of the operation period, the discharging circuit can be controlled to be cut off, and the second power stage circuit may be controlled to operate in a PWM control mode to charge the piezoelectric load, such that the power supply voltage signal corresponds to the reference voltage in the first interval. During the second operation interval of the operation period, the second power stage circuit can be controlled to be cut off and the discharging circuit may be controlled to operate in a PWM control mode to discharge the piezoelectric load, such that the power supply voltage signal corresponds to the reference voltage in the second interval.

The first type of driving circuit can be aimed at the second power stage circuit with any output voltage, particularly for the case whereby the minimum value of the output voltage of the second power stage circuit is not greater than the minimum value of the reference voltage, such that the total harmonic distortion of the power supply voltage signal provided by the first type of the driving circuit is relatively small. However, the first type of the driving circuit can also be applied when the minimum value of the output voltage of the second power stage circuit is greater than the minimum value of the reference voltage. The reference voltage in the first interval can be the rising part of the reference voltage (e.g., the reference voltage increases from its minimum value to its maximum value within the period), and the reference voltage in the second interval can be the falling part of the reference voltage (e.g., the reference voltage decreases from its maximum value to its minimum value within the period).

The second type of the driving circuit can substantially solve the problem of a large total harmonic distortion of the power supply voltage signal provided by the first type of the driving circuit when the minimum value of the output voltage of the second power stage circuit is greater than the minimum value of the reference voltage. Since the minimum value of the output voltage of the second power stage circuit is greater than the minimum value of the reference voltage, the power supply voltage signal provided by the second type of the driving circuit may not track the reference voltage during an interval where the reference voltage rises from its minimum value to the minimum value of the output voltage of the second power stage circuit, which can increase the total harmonic distortion of the power supply voltage signal. In order to reduce the total harmonic distortion, the switching circuit can be added to the second type of the driving circuit.

One operation period of the second type of the driving circuit can include three operation intervals. During the third operation interval of the operation period, the switching circuit can be controlled to operate in the linear adjustment mode, and the switching circuit directly can charge the piezoelectric load, such that the power supply voltage signal corresponds to the reference voltage in the third interval (e.g., the reference voltage increases from its minimum value to the minimum value of the output voltage of the second power stage circuit within the period). During the first operation interval of the operation period, the switching circuit can be controlled to operate in the fully conductive state and transmit the first voltage to the second power stage circuit, and the second power stage circuit can be controlled to operate in a PWM control mode, such that the power supply voltage signal corresponds to the reference voltage in the first interval within the period (e.g., the reference voltage increases from the minimum value of the output voltage of the second power stage circuit to its maximum value. During the second operation interval of the operation period, both the switching circuit and the second power stage circuit can be controlled to be cut off, and the discharging circuit may be controlled to operate in a PWM control mode, such that the power supply voltage signal corresponds to the reference voltage in the second interval (e.g., the reference voltage decreases from its maximum value to its minimum value within the period).

In one embodiment, the waveform of the reference voltage can be a sine wave with a trough value not less than zero. As described herein the waveform of the reference voltage is exemplified as a sine wave with a trough value not less than zero as an example. However, the reference voltage may be in other forms. For example, the waveform of the reference voltage can be a rectified sine wave. The piezoelectric load in certain embodiments can include a piezoelectric device such as a piezoelectric ceramic or a piezoelectric actuator. Switches in certain embodiments may not only be implemented by MOS transistors, but also implemented by BJTs or IGBTs, or any suitable type of transistors. Also, the first and second power stage circuits may both be power stage circuits with a boost function.

As described herein, the first power stage circuit is a boost circuit or a flyback circuit, and the second power stage circuit is a SEPIC circuit or a boost circuit, but any topologies can be supported in certain embodiments. Further, the output end of the second power stage circuit can be coupled to an output capacitor, or not coupled to an output capacitor in some cases. When the output end of the second power stage circuit is not coupled to an output capacitor, the second power stage circuit may directly and only discharge the piezoelectric load, thereby reducing the energy loss. Therefore, in particular embodiments, the output end of the second power stage circuit may not be coupled to an output capacitor. The driving circuit can drive a piezoelectric load or multiple piezoelectric loads, and may include a relatively few switches, a simple structure, and therefore can be easily implemented to facilitate circuit integration. In addition, additional voltage output circuits can be for driving piezoelectric loads, and voltage output circuits may not interfere with each other. The driving circuit in particular embodiments can output varying direct current voltage or alternating current voltage, and the output waveform of the driving circuit can be programmable. In some examples, all switches in the driving circuit can be common ground switches, which may require simpler detection and control technologies than floating ground switches, thereby facilitating circuit integration.

As compared with other approaches, the driving circuit in particular embodiments may have a relatively simple structure with fewer devices, such that the volume of the driving circuit is reduced, the cost of the driving circuit is reduced, and the power density of the driving circuit is improved. The driving circuit can drive one piezoelectric load; that is, the driving circuit may have a single output. The driving circuit may further be configured to drive multiple piezoelectric loads; that is, the driving circuit has multiple outputs. For example, the driving circuit can include at least two voltage output circuits that are connected in parallel with each other. Each of the at least two voltage output circuits can include a selection switch, and the selection switch can connect in series with a piezoelectric load driven by the voltage output circuit, and may be switched on or off to control the voltage output circuit to be on or off. As described herein, the driving circuit can include two outputs to drive two piezoelectric loads. However, the number of output of the driving circuit and the number of piezoelectric loads driven by the driving circuit are not so limited in particular embodiments.

Figure 4:
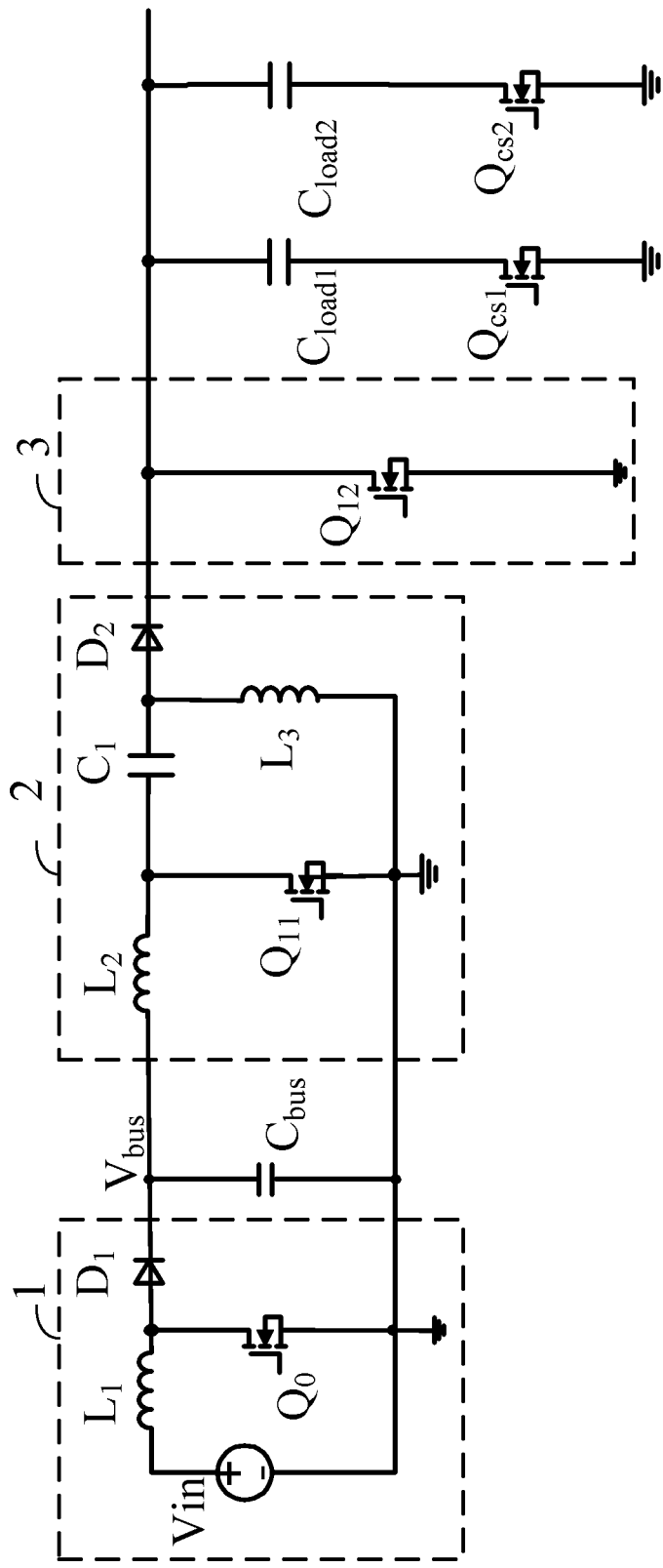
FIG. 4 is a schematic diagram of an example first type of a driving circuit, in accordance with embodiments of the present invention.

Referring now to FIG. 4, shown is a schematic diagram of an example first type of a driving circuit, in accordance with embodiments of the present invention. In this particular example, the driving circuit can include energy-storage capacitor $C_{bus}$, power stage circuit 1, power stage circuit 2, and discharging circuit 3, and may provide the power supply voltage signal to piezoelectric load $C_{load1}$ or $C_{load2}$, in order to drive piezoelectric load $C_{load1}$ or $C_{load2}$. Power stage circuit 1 can convert input voltage Vin into voltage $V_1$. Voltage $V_1$ can be the voltage after the voltage $V_{bus}$ on energy-storage capacitor $C_{bus}$ is stabilized, and voltage $V_1$ may be stored in energy-storage capacitor $C_{bus}$.

During the first operation interval of the operation period, power stage circuit 2 may receive voltage $V_1$ to charge the piezoelectric load $C_{load1}$ or $C_{load2}$, such that the power supply voltage signal provided to the piezoelectric load $C_{load1}$ or $C_{load2}$ in the first operation interval corresponds to the reference voltage in the first interval. During the second operation interval of the operation period, discharging circuit 3 can discharge the piezoelectric load $C_{load1}$ or $C_{load2}$, such that the power supply voltage signal in the second operation interval corresponds to the reference voltage in the second interval. In this example, the waveform of the reference voltage can be a sine wave with a trough value not less than zero. Also, the reference voltage in the first interval can be the rising part of the reference voltage (e.g., the reference voltage increases from its minimum value to its maximum value within the period), and the reference voltage in the second interval can be the falling part of the reference voltage (e.g., the reference voltage decreases from its maximum value to its minimum value within the period).

For example, the driving circuit can also include a control circuit (not shown in FIG. 4). During the first operation interval, the control circuit can control discharging circuit 3 to be cut off and power stage circuit 2 to operate, such that the power supply voltage signal corresponds to the reference voltage in the first interval. During the second operation interval, the control circuit can control power stage circuit 2 to be cut off and discharging circuit 3 to operate, such that the power supply voltage signal corresponds to the reference voltage in the second interval.

For example, during the first operation interval, discharging circuit 3 can be controlled to be cut off, and power stage circuit 2 may be controlled to operate in a PWM control mode, in order to charge the piezoelectric load. During the second operation interval, power stage circuit 2 can be controlled to be cut off, and discharging circuit 3 may be controlled to operate in a PWM control mode, in order to discharge the piezoelectric load. Further, during the first operation interval, the duty cycles of switches in power stage circuit 2 can be controlled to adjust the power supply voltage signal to change along with the reference voltage in the first interval. During the second operation interval, the duty cycles of switches in discharging circuit 3 can be controlled to adjust the power supply voltage signal to change along with the reference voltage in the second interval.

For example, power stage circuit 1 can be a boost circuit, and power stage circuit 2 can be a SEPIC circuit. The minimum value of the reference voltage can be 0, and the minimum value of the output voltage of power stage circuit 2 can be 0. Thus, during the entire rising part of the reference voltage, power stage circuit 2 can charge the piezoelectric load, and the power supply voltage signal can track the reference voltage; therefore, the total harmonic distortion of the power supply voltage signal can be relatively small. In other examples, power stage circuits 1 and 2 can also be in other topological forms, and both power stage circuit 1 and power stage circuit 2 may have a boost function.

The boost circuit can include switch $Q_0$, diode $D_1$, and inductor $L_1$. Switch $Q_0$ and inductor $L_1$ can connect in series at the output end of the input power supply, the common end of switch $Q_0$ and the input power supply may be grounded. One end of diode $D_1$ can connect to the common end of switch $Q_0$ and inductor $L_1$, and the other end of diode $D_1$ can connect to one end of energy-storage capacitor $C_{bus}$, and the other end of energy-storage capacitor $C_{bus}$ is grounded. The input power supply can provide input voltage Vin. The SEPIC circuit can include inductor $L_2$, switch $Q_{11}$, capacitor $C_1$, inductor $L_3$ and diode $D_2$. Inductor $L_2$ and switch $Q_{11}$ can connect in series at the two terminals of energy-storage capacitor $C_{bus}$, the common end of switch $Q_{11}$ and energy-storage capacitor $C_{bus}$ may be grounded. One end of capacitor $C_1$ can connect to the common end of switch $Q_{11}$ and inductor $L_2$, and the other end of capacitor $C_1$ can connect to one end of diode $D_2$. The other end of diode $D_2$ can be used as the high potential end of output end of power stage circuit 2.

Since the low potential end of output end of power stage circuit 2 is a ground potential end, the power supply voltage signal may be generated at the high potential end of output end of power stage circuit 2. One end of inductor $L_3$ can connect to the common end of capacitor $C_1$ and diode $D_2$, and the other end of inductor $L_3$ may be grounded. Discharging circuit 3 can include switch $Q_{12}$. One end of switch $Q_{12}$ can connect to the high potential end of output end of power stage circuit 2, and the other end of switch $Q_{12}$ may be grounded. In this example, the output end of power stage circuit 2 may not be coupled to an output capacitor, so power stage circuit 2 can directly and only discharge the piezoelectric load, thereby reducing the energy loss. In other examples, the output end of power stage circuit 2 may be coupled to an output capacitor.

In particular embodiments, the control circuit can control the switching states of switch $Q_{11}$ in power stage circuit 2 and switch $Q_{12}$ in discharging circuit 3, such that the power supply voltage signal is adjusted to change with the reference voltage. For example, the power supply voltage signal provided to the piezoelectric load in the first operation interval of the operation period may correspond to the reference voltage in the first interval of the period, and the power supply voltage signal in the second operation interval of the operation period may correspond to the reference voltage in the second interval of the period.

The driving circuit can also include two voltage output circuits to drive piezoelectric loads $C_{load1}$ and $C_{load2}$, respectively, and the two voltage output circuits can connect in parallel at the output end of power stage circuit 2. The driving circuit can include a first voltage output circuit and a second voltage output circuit. The first and second voltage output circuits can include selection switches $Q_{cs1}$ and $Q_{cs2}$, respectively. Selection switch $Q_{cs1}$ can connect in series with piezoelectric load $C_{load1}$, and may be controlled to be switched on or off to control the first voltage output circuit to be on or off so as to drive or not drive piezoelectric load $C_{load1}$. Selection switch $Q_{cs2}$ can connect in series with piezoelectric load $C_{load2}$, and can be controlled to be switched on or off to control the second voltage output circuit to be on or off so as to drive or not drive piezoelectric load $C_{load2}$.

In particular embodiments, when piezoelectric load $C_{load1}$ or piezoelectric load $C_{load2}$ is required to be driven, selection switch $Q_{cs1}$ or selection switch $Q_{cs2}$ can be controlled to be switched on, and power stage circuit 2 and discharging circuit 3 in the driving circuit start to operate. In other examples, the driving circuit can include no voltage output circuit, and power stage circuit 2 can connect in parallel with piezoelectric loads $C_{load1}$ and $C_{load2}$. In this example, a terminal of selection switch $Q_{cs1}$ and a terminal of selection switch $Q_{cs2}$ may be grounded, and selection switches $Q_{cs1}$ and $Q_{cs2}$ can be common ground switches. In other examples, an end of piezoelectric load $C_{load1}$ and an end of piezoelectric load $C_{load2}$ may be grounded, and selection switches $Q_{cs1}$ and $Q_{cs2}$ can be floating ground switches. For example, selection switches Qcs1 and $Q_{cs2}$ can be switching transistors. For example, switch $Q_0$ in power stage circuit 1, switch $Q_{11}$ in power stage circuit 2, switch $Q_{12}$ in discharging circuit 3, selection switch $Q_{cs1}$, and selection switch $Q_{cs2}$ may all be common ground switches. That is, switches in the driving circuit can all be common ground switches, which may require simpler detection and control technologies than floating ground switches, thereby facilitating circuit integration.

Figure 5:
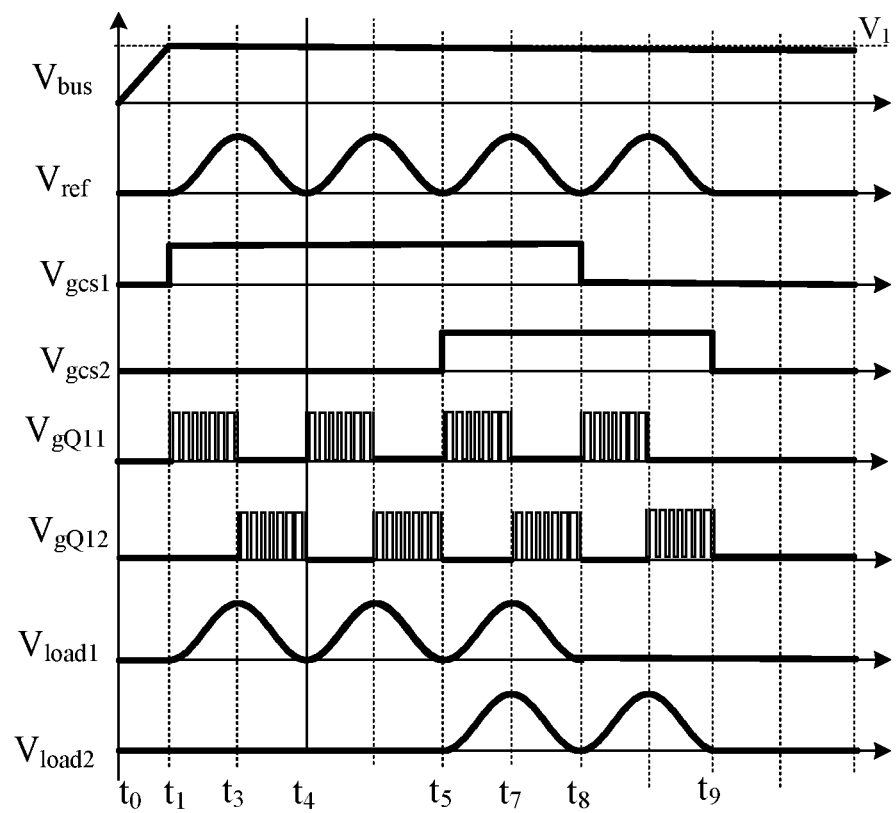
FIG. 5 is a waveform diagram of example operation of the first type of the driving circuit, in accordance with embodiments of the present invention.

Referring now to FIG. 5, shown is a waveform diagram of example operation of the first type of the driving circuit, in accordance with embodiments of the present invention. An operation process of the first type of the driving circuit is described below in conjunction with FIGS. 4 and 5. For example, $V_{bus}$ may represent the voltage on energy-storage capacitor $C_{bus}$, $V_1$ may represent the first voltage after the voltage $V_{bus}$ on energy-storage capacitor $C_{bus}$ is stabilized, and $V_{ref}$ may represent the reference voltage. A waveform of the reference voltage can be a sine wave with a trough value not less than zero. $V_{gQ11}$ may represent a driving signal for switch $Q_{11}$, $V_{gQ12}$ may represent a driving signal for switch $Q_{12}$, $V_{gcs1}$ may represent a driving signal for selection switch $Q_{cs1}$, $V_{gcs2}$ may represent a driving signal for selection switch $Q_{cs2}$, $V_{load1}$ may represent a voltage difference between two ends of piezoelectric load $C_{load1}$, and $V_{load2}$ may represent a voltage difference between two ends of piezoelectric load $C_{load2}$. In this example, the power supply voltage signal can be set as voltage difference $V_{load1}$ between two ends of piezoelectric load $C_{load1}$ or voltage difference $V_{load2}$ between two ends of piezoelectric load $C_{load2}$.

For driving piezoelectric load $C_{load1}$, from time $t_0$, switch $Q_0$ in power stage circuit 1 may operate in a PWM mode, such that voltage $V_{bus}$ on energy-storage capacitor $C_{bus}$ rises from zero, and until time $t_1$, voltage $V_{bus}$ on energy-storage capacitor $C_{bus}$ reaches voltage $V_1$. After that, power stage circuit 1 may still operate to stabilize voltage $V_{bus}$ on energy-storage capacitor $C_{bus}$ at voltage $V_1$. At any time after voltage $V_{bus}$ on energy-storage capacitor $C_{bus}$ stabilizes at voltage $V_1$, reference voltage $V_{ref}$ can be output, and selection switch $Q_{cs1}$ or selection switch $Q_{cs2}$ can also be driven. In FIG. 5, reference voltage $V_{ref}$ may be output and selection switch $Q_{cs1}$ can be driven from time $t_1$. At time $t_1$, $V_{gcs1}$ can be at a high level and selection switch $Q_{cs1}$ may be switched on.

During time interval $t_1$-$t_3$, switch $Q_{11}$ in power stage circuit 2 may operate in a PWM mode, and switch $Q_{12}$ in discharging circuit 3 can be turned off. During this time interval, power stage circuit 2 can charge piezoelectric load $C_{load1}$, such that the power supply voltage signal increases with reference voltage $V_{ref}$ in this time interval. Voltage difference $V_{load1}$ between two ends of piezoelectric load $C_{load1}$ during this time interval can be as shown in FIG. 5. During time interval $t_3$-$t_4$, switch $Q_{11}$ in power stage circuit 2 may be turned off, and switch $Q_{12}$ in discharging circuit 3 can operate in a PWM mode. During this time interval, discharging circuit 3 may discharge piezoelectric load $C_{load1}$, such that the power supply voltage signal decreases with reference voltage $V_{ref}$ in this time interval. Voltage difference $V_{load1}$ between two ends of piezoelectric load $C_{load1}$ during this time interval can be as shown in FIG. 5. Time interval $t_1$-$t_4$ is one operation period, and the operation process during time interval $t_1$-$t_4$ may be repeated, such that the power supply voltage signal changes along with reference voltage $V_{ref}$, until time $t_8$. At time $t_8$, selection switch $Q_{cs1}$ can be turned off, such that piezoelectric load $C_{load1}$ is disconnected from the driving circuit, and voltage difference $V_{load1}$ between two ends of piezoelectric load $C_{load1}$ may be equal to 0.

For driving piezoelectric load $C_{load2}$, during time interval $t_5$-$t_9$, $V_{gcs2}$ can be at a high level and selection switch $Q_{cs2}$ may be switched on. A waveform of voltage difference $V_{load2}$ between two ends of piezoelectric load $C_{load2}$ may be the same as the waveform of voltage difference $V_{load1}$ when piezoelectric load $C_{load1}$ is driven. In addition, the operation process of driving circuit when selection switch $Q_{cs2}$ is turned on can be the same as the operation process of driving circuit when selection switch $Q_{cs1}$ is turned on. During time interval $t_5$-$t_8$, $V_{gcs1}$ and $V_{gcs2}$ may both be at a high level, such that the two voltage output circuits may all be switched on to drive piezoelectric loads $C_{load1}$ and $C_{load2}$, respectively. At time $t_9$, $V_{gcs1}$ and $V_{gcs2}$ may both be at a low level, such that the two voltage output circuits are all switched off. Voltage difference $V_{load1}$ between two ends of piezoelectric load $C_{load1}$ can be equal to 0, and voltage difference $V_{load2}$ between two ends of piezoelectric load $C_{load2}$ may be equal to 0.

Figure 6:
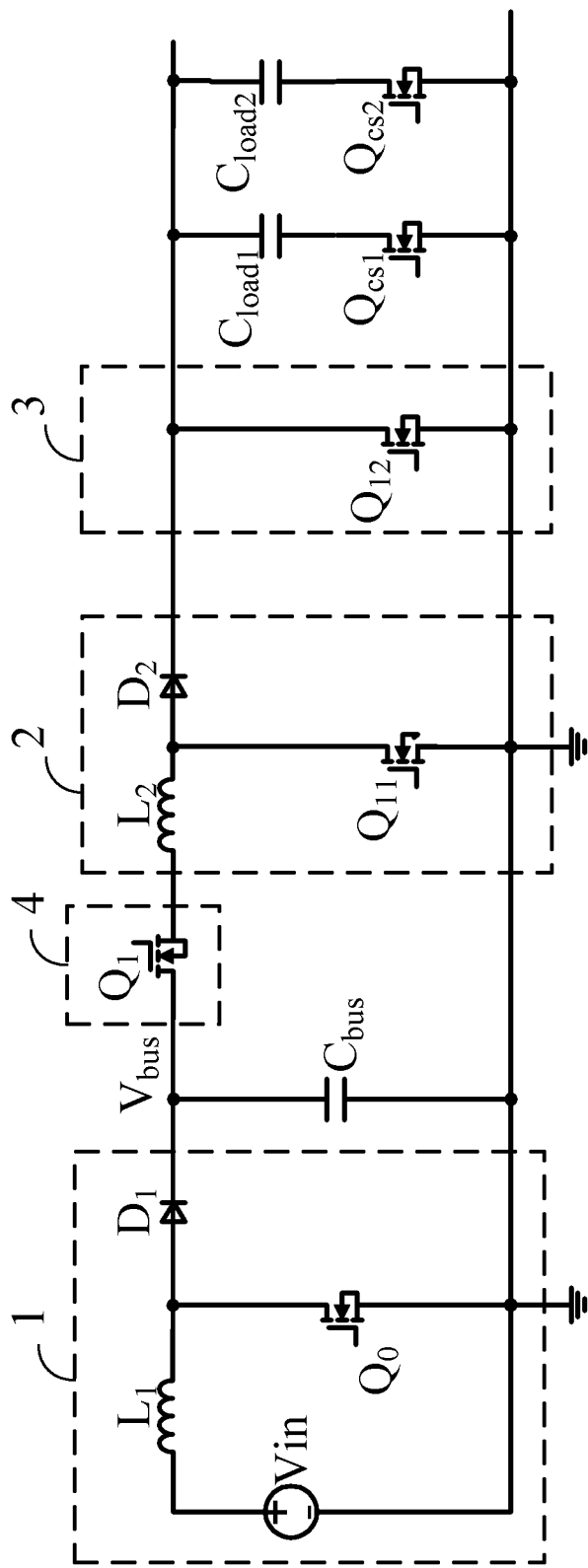
FIG. 6 is a schematic diagram of a first example of a second type of a driving circuit, in accordance with embodiments of the present invention.

Referring now to FIG. 6, shown is a schematic diagram of a first example of a second type of a driving circuit, in accordance with embodiments of the present invention. In this particular example, the driving circuit can include energy-storage capacitor $C_{bus}$, power stage circuit 1, power stage circuit 2, discharging circuit 3, and switching circuit 4, and may provide the power supply voltage signal to piezoelectric load $C_{load1}$ or $C_{load2}$, in order to drive piezoelectric load $C_{load1}$ or $C_{load2}$. Power stage circuit 1 can convert input voltage Vin into voltage $V_1$. Voltage $V_1$ can be the voltage after the voltage $V_{bus}$ on energy-storage capacitor $C_{bus}$ is stabilized, and voltage $V_1$ can be stored in energy-storage capacitor $C_{bus}$.

During the first operation interval of the operation period, power stage circuit 2 may receive voltage $V_1$ to charge the piezoelectric load $C_{load1}$ or $C_{load2}$, such that the power supply voltage signal provided to the piezoelectric load $C_{load1}$ or $C_{load2}$ in the first operation interval corresponds to the reference voltage in the first interval. During the second operation interval of the operation period, discharging circuit 3 may discharge the piezoelectric load $C_{load1}$ or $C_{load2}$, such that the power supply voltage signal in the second operation interval corresponds to the reference voltage in the second interval. During the third operation interval of the operation period, switching circuit 4 may receive voltage $V_1$ to charge the piezoelectric load $C_{load1}$ or $C_{load2}$, such that the power supply voltage signal in the third operation interval corresponds to the reference voltage in the third interval.

In particular embodiments, the waveform of the reference voltage can be a sine wave with a trough value not less than zero. Also, the reference voltage in the third interval may correspond to the reference voltage increases from its minimum value to the minimum value of the output voltage of power stage circuit 2 within the period, the reference voltage in the first interval may correspond to the reference voltage increases from the minimum value of the output voltage of power stage circuit 2 to its maximum value within the period, and the reference voltage in the second interval can be the falling part of the reference voltage (e.g., the reference voltage decreases from its maximum value to its minimum value within the period).

In particular embodiments, the driving circuit can also include a control circuit (not shown in FIG. 6). During the first and third operation intervals, the control circuit can control discharging circuit 3 to be cut off, and control switching circuit 4 and power stage circuit 2 to operate, such that the power supply voltage signal corresponds to the reference voltage in the first interval and in the third interval. During the second operation interval, the control circuit can control switching circuit 4 and power stage circuit 2 to be cut off, and control discharging circuit 3 to operate, such that the power supply voltage signal corresponds to the reference voltage in the second interval. During the third operation interval, switching circuit 4 can be controlled to operate in the linear adjustment mode to charge the piezoelectric load, such that the power supply voltage signal corresponds to the reference voltage in the third interval. During the first operation interval, switching circuit 4 can be controlled to operate in the fully conductive state, and power stage circuit 2 may be controlled to operate, such that the power supply voltage signal corresponds to the reference voltage in the first interval.

For example, during the third operation interval, power stage circuit 2 may not operate in the PWM control mode, discharging circuit 3 can be controlled to be cut off, and switching circuit 4 may be controlled to operate in the linear adjustment mode. Also, switching circuit 4 may receive voltage $V_1$, and charge the piezoelectric load through some components of power stage circuit 2, such that the power supply voltage signal corresponds to the reference voltage in a third interval. In this example, during the third operation interval, power stage circuit 2 can be controlled to be cut off. During the first operation interval, switching circuit 4 can be controlled to operate in the fully conductive state, discharging circuit 3 can be controlled to be cut off, and power stage circuit 2 can be controlled to operate in the PWM control mode, such that the power supply voltage signal corresponds to the reference voltage in the first interval. During the second operation interval, both switching circuit 4 and power stage circuit 2 may be controlled to be cut off, and discharging circuit 3 can be controlled to operate in the PWM control mode, such that the power supply voltage signal corresponds to the reference voltage in the second interval.

During the third operation interval, the on-resistance of switching circuit 4 can be controlled to adjust the power supply voltage signal to change with the reference voltage in the third interval. During the first operation interval, the duty cycles of switches in power stage circuit 2 may be controlled to adjust the power supply voltage signal to change along with the reference voltage in the first interval. In addition, during the second operation interval, the duty cycles of switches in discharging circuit 3 can be controlled to adjust the power supply voltage signal to change along with the reference voltage in the second interval.

In particular embodiments, both of power stage circuits 1 and circuit 2 can be boost circuits. The minimum value of the reference voltage can be 0, and the minimum value of the output voltage of power stage circuit 2 may be equal to voltage $V_1$ (e.g., the input voltage of power stage circuit 2). Thus, the minimum value of the output voltage of power stage circuit 2 can be greater than the minimum value of the reference voltage, and the power supply voltage signal output by power stage circuit 2 may not track the reference voltage when the reference voltage increases from its minimum value to the minimum value of the output voltage of power stage circuit 2 (e.g., the reference voltage in the second interval). Therefore, switching circuit 4 may output the power supply voltage signal to track the reference voltage to charge the piezoelectric load when the reference voltage increases from its minimum value to the minimum value of the output voltage of power stage circuit 2 (e.g., the reference voltage in the second interval), thereby reducing the total harmonic distortion. In other examples, power stage circuits 1 and 2 may also have other forms. Both of power stage circuits 1 and 2 may have a boost function, and the minimum value of the output voltage of second power stage circuit 2 can be greater than the minimum value of the reference voltage.

Switching circuit 4 can include switch $Q_1$, and power stage circuit 1 can include switch $Q_0$, diode $D_1$, and inductor $L_1$. Switch $Q_0$ and inductor $L_1$ can connect in series at the output end of the input power supply, and the common end of switch $Q_0$ and the input power supply may be grounded. One end of diode $D_1$ can connect to the common end of switch $Q_0$ and inductor $L_1$, and the other end of diode $D_1$ can connect to one end of switch $Q_1$. One end of energy-storage capacitor $C_{bus}$ can connect to the common end of diode $D_1$ and switch $Q_1$, and the other end of energy-storage capacitor $C_{bus}$ may be grounded. The input power supply may provide input voltage Vin. Power stage circuit 2 can include inductor $L_2$, switch $Q_{11}$, and diode $D_2$. One end of inductor $L_2$ can connect to the other end of switch $Q_1$, the other end of inductor $L_2$ can connect to one end of diode $D_2$, and the other end of diode $D_2$ can be used as the high potential end of output end of power stage circuit 2.

Since the low potential end of output end of power stage circuit 2 may be at the ground potential end, the power supply voltage signal may be generated at the high potential end of output end of power stage circuit 2. One end of switch $Q_{11}$ can connect to the common end of inductor $L_2$ and diode $D_2$, and the other end of switch $Q_{11}$ may be grounded.

Discharging circuit 3 can include switch $Q_{12}$. One end of switch $Q_{12}$ can connect to the high potential end of output end of power stage circuit 2, and the other end of switch $Q_{12}$ may be grounded. In this example, the output end of second power stage circuit 2 may not be coupled to an output capacitor, so power stage circuit 2 can directly discharge the piezoelectric load, thereby reducing the energy loss. In other examples, the output end of power stage circuit 2 may be coupled to an output capacitor.

In particular embodiments, the control circuit can control the switching states of switch $Q_{11}$ in power stage circuit 2, switch $Q_{12}$ in discharging circuit 3, and switch $Q_1$ in switching circuit 4, such that the power supply voltage signal is adjusted to change with the reference voltage. For example, the power supply voltage signal in the third operation interval of the operation period may correspond to the reference voltage in the third interval of the period, the power supply voltage signal in the first operation interval of the operation period may correspond to the reference voltage in the first interval of the period, and the power supply voltage signal in the second operation interval of the operation period may correspond to the reference voltage in the second interval of the period.

The driving circuit can also include two voltage output circuits to drive piezoelectric loads $C_{load1}$ and $C_{load2}$, respectively, and the two voltage output circuits can connect in parallel at the output end of second power stage circuit 2. The driving circuit can include a first voltage output circuit and a second voltage output circuit. The first and second voltage output circuits can include selection switches $Q_{cs1}$ and $Q_{cs2}$, respectively. Selection switch $Q_{cs1}$ can connect in series with piezoelectric load $C_{load1}$, and may be controlled to be switched on or off to control the first voltage output circuit to be on or off so as to drive or not drive piezoelectric load $C_{load1}$. Selection switch $Q_{cs2}$ can connect in series with piezoelectric load $C_{load2}$, and can be controlled to be switched on or off to control the second voltage output circuit to be on or off, in order as to drive or not drive piezoelectric load $C_{load2}$.

In particular embodiments, when piezoelectric load $C_{load1}$ or piezoelectric load $C_{load2}$ is required to be driven, selection switch $Q_{cs1}$ or selection switch $Q_{cs2}$ can be controlled to be switched on, and power stage circuit 2 or discharging circuit 3 or switching circuit 4 in the driving circuit may start to operate. In other examples, the driving circuit can include no voltage output circuit, and power stage circuit 2 can connect in parallel with piezoelectric load $C_{load1}$ and piezoelectric load $C_{load2}$. In this example, a terminal of selection switches $Q_{cs1}$ and $Q_{cs2}$ may be grounded, and selection switches $Q_{cs1}$ and $Q_{cs2}$ can be common ground switches. In other examples, an end of piezoelectric loads $C_{load1}$ and $C_{load2}$ may be grounded, and selection switches $Q_{cs1}$ and $Q_{cs2}$ can be floating ground switches. For example, selection switches Qcs1 and $Q_{cs2}$ can be switching transistors. Also for example, switch $Q_0$ in power stage circuit 1, switch $Q_{11}$ in power stage circuit 2, switch $Q_{12}$ in discharging circuit 3, selection switch $Q_{cs1}$, and selection switch $Q_{cs2}$ may all be common ground switches, which may require simpler detection and control technologies than floating ground switches, thereby facilitating circuit integration.

Figure 7:
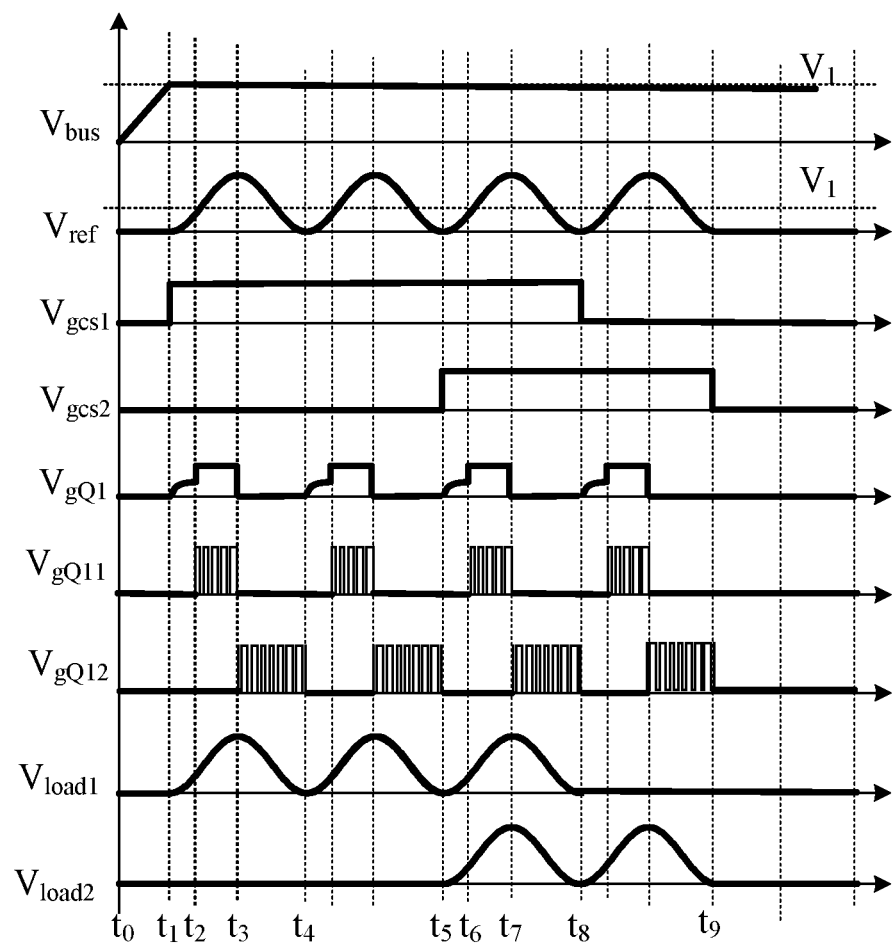
FIG. 7 is a waveform diagram of example operation of the second type of the driving circuit of FIG. 6, in accordance with embodiments of the present invention.

Referring now to FIG. 7, shown is a waveform diagram of example operation of the second type of the driving circuit of FIG. 6, in accordance with embodiments of the present invention. An operation process of the second type of the driving circuit according to the first embodiment is described below in conjunction with FIGS. 6 and 7. For example, $V_{bus}$ may represent the voltage on energy-storage capacitor $C_{bus}$, $V_1$ may represent the first voltage after the voltage $V_{bus}$ on energy-storage capacitor $C_{bus}$ is stabilized, and $V_{ref}$ may represent the reference voltage. A waveform of the reference voltage is a sine wave with a trough value not less than zero. $V_{gQ1}$ may represent a driving signal for switch $Q_1$, $V_{gQ11}$ may represent a driving signal for switch $Q_{11}$, $V_{gQ12}$ may represent a driving signal for switch $Q_{12}$, $V_{gcs1}$ may represent a driving signal for selection switch $Q_{cs1}$, $V_{gcs2}$ may represent a driving signal for selection switch $Q_{cs2}$, $V_{load1}$ may represent a voltage difference between two ends of piezoelectric load $C_{load1}$, and $V_{load2}$ may represent a voltage difference between two ends of piezoelectric load $C_{load2}$. For example, the power supply voltage signal can be set as voltage difference $V_{load1}$ between two ends of piezoelectric load $C_{load1}$ or voltage difference $V_{load2}$ between two ends of piezoelectric load $C_{load2}$.

For driving piezoelectric load $C_{load1}$, from time t0, switch $Q_0$ in power stage circuit 1 may operate in a PWM mode, such that the voltage $V_{bus}$ on energy-storage capacitor $C_{bus}$ rises from zero, and until time $t_1$, the voltage $V_{bus}$ on energy-storage capacitor $C_{bus}$ reaches voltage $V_1$. After that, power stage circuit 1 may still operate to stabilize the voltage $V_{bus}$ on energy-storage capacitor $C_{bus}$ at voltage $V_1$. At any time after the voltage $V_{bus}$ on energy-storage capacitor $C_{bus}$ stabilizes at voltage $V_1$, reference voltage $V_{ref}$ can be output, and selection switch $Q_{cs1}$ or selection switch $Q_{cs2}$ can also be driven. In FIG. 7, reference voltage $V_{ref}$ may be output and selection switch $Q_{cs1}$ driven from time $t_1$. At time $t_1$, $V_{gcs1}$ can be at a high level and selection switch $Q_{cs1}$ may be switched on.

During time interval $t_1$-$t_2$ (corresponding to the third operation interval), the reference voltage rises from its minimum value to the minimum value of the output voltage of power stage circuit 2. Switch $Q_1$ may operate in the linear state, which is equivalent to a variable resistor. Both switch $Q_{11}$ in power stage circuit 2 and switch $Q_{12}$ in discharging circuit 3 can be turned off. Switch $Q_1$ may receive voltage $V_1$, and can charge the piezoelectric load through inductor $L_2$ and diode $D_2$ in power stage circuit 2. The driving voltage of switch $Q_1$ can be controlled such that the on-resistance of switch $Q_1$ changes, and the power supply voltage signal increases along with reference voltage $V_{ref}$ in this time interval. Voltage difference $V_{load1}$ between two ends of piezoelectric load $C_{load1}$ during this time interval can be as shown in FIG. 7.

During time interval $t_2$-$t_3$ (corresponding to the first operation interval), the reference voltage may rise from the minimum value of the output voltage of power stage circuit 2 to its maximum value. Switch $Q_1$ can operate in the fully conductive state, switch $Q_{11}$ in power stage circuit 2 may operate in the PWM mode, and switch $Q_{12}$ in discharging circuit 3 can be turned off. During this time interval, power stage circuit 2 can charge piezoelectric load $C_{load1}$, and the duty cycle of switch $Q_{11}$ in power stage circuit 2 can be controlled, such that the power supply voltage signal increases with reference voltage $V_{ref}$ in this time interval. Voltage difference $V_{load1}$ between two ends of piezoelectric load $C_{load1}$ during this time interval can be as shown in FIG. 7.

During time interval $t_3$-$t_4$ (corresponding to the second operation interval), the reference voltage may decrease from its maximum value to its minimum value. Switch $Q_1$ can be turned off, switch $Q_{11}$ in power stage circuit 2 can be turned off, and switch $Q_{12}$ in discharging circuit 3 may operate in the PWM mode. During this time interval, discharging circuit 3 can discharge piezoelectric load $C_{load1}$, and the duty cycle of switch $Q_{12}$ in discharging circuit 3 can be controlled, such that the power supply voltage signal decreases with reference voltage $V_{ref}$ in this time interval. Voltage difference $V_{load1}$ between two ends of piezoelectric load $C_{load1}$ during this time interval may be as shown in FIG. 7. Time interval $t_1$-$t_4$ is one operation period, and the operation process during time interval $t_1$-$t_4$ may be repeated, such that the power supply voltage signal changes along with reference voltage $V_{ref}$, until time $t_8$. At time $t_8$, selection switch $Q_{cs1}$ can be turned off, such that piezoelectric load $C_{load1}$ is disconnected from the driving circuit, and voltage difference $V_{load1}$ between two ends of piezoelectric load $C_{load1}$ can be equal to 0.

For driving piezoelectric load $C_{load2}$, during time interval $t_5$-$t_9$, $V_{gcs2}$ may be at a high level and selection switch $Q_{cs2}$ can be switched on. A waveform of voltage difference $V_{load2}$ between two ends of piezoelectric load $C_{load2}$ may be the same as the waveform of voltage difference $V_{load1}$ when piezoelectric load $C_{load1}$ is driven. In addition, the operation process of driving circuit when selection switch $Q_{cs2}$ is turned on may be the same as the operation process of driving circuit when selection switch $Q_{cs1}$ is turned on. During time interval $t_5$-$t_8$, $V_{gcs1}$ and $V_{gcs2}$ can both be at a high level, such that the two voltage output circuits are all switched on to drive piezoelectric load $C_{load1}$ and piezoelectric load $C_{load2}$, respectively. At time $t_9$, $V_{gcs1}$ and $V_{gcs2}$ may both be at a low level, such that the two voltage output circuits are all switched off. Voltage difference $V_{load1}$ between two ends of piezoelectric load $C_{load1}$ may be equal to 0, and voltage difference $V_{load2}$ between two ends of piezoelectric load $C_{load2}$ can be equal to 0.

Figure 8:
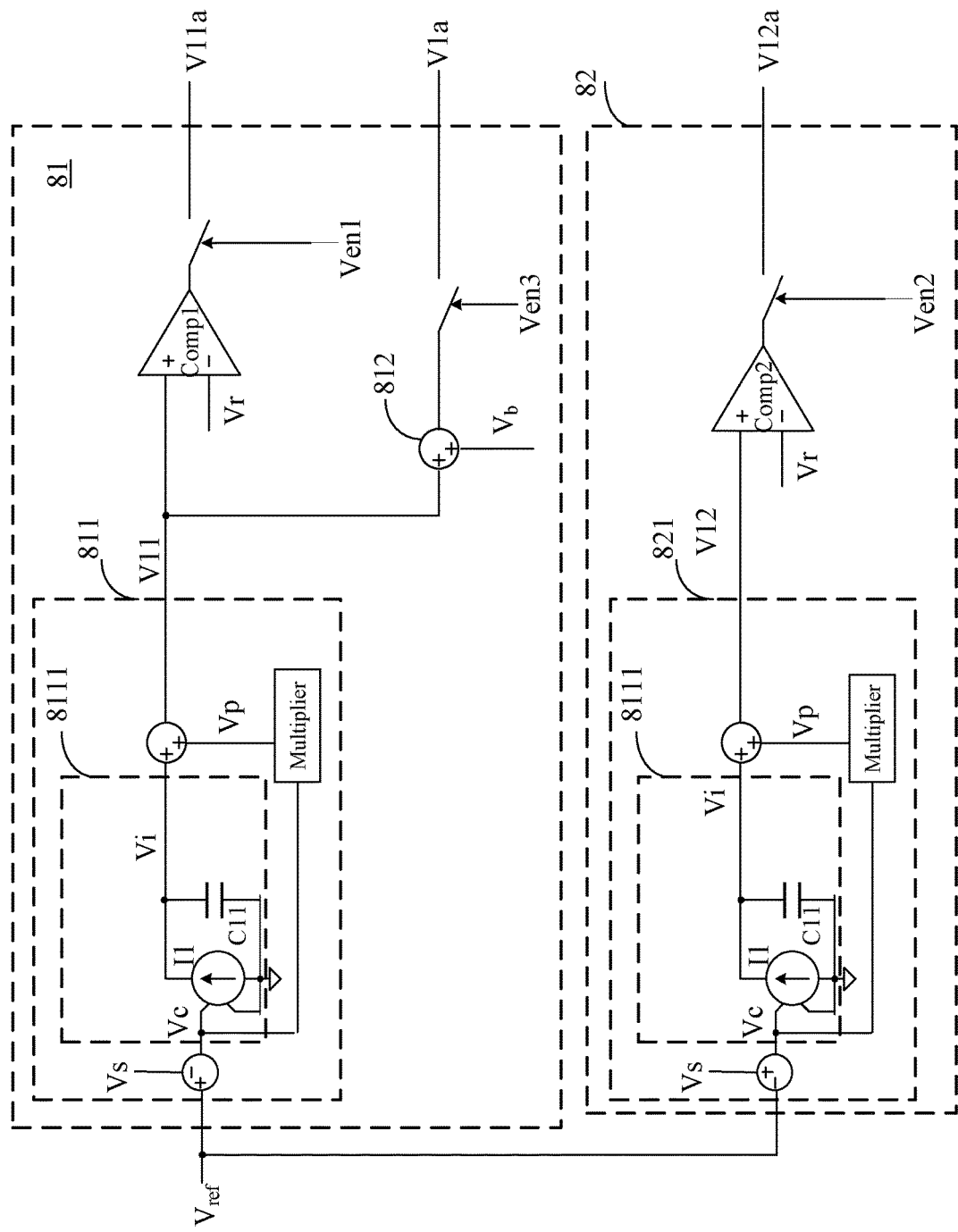
FIG. 8 is a schematic diagram of an example control circuit of the second type of the driving circuit, in accordance with embodiments of the present invention.

Referring now to FIG. 8, shown is a schematic diagram of an example control circuit of the second type of the driving circuit, in accordance with embodiments of the present invention. In this particular example, the control circuit can include control circuits 81 and 82. Control circuit 81 can generate control signals V11a and V1a according to compensation signal Vc to control the switching states of switch $Q_{11}$ in power stage circuit 2 and switch $Q_1$ in switching circuit 4, respectively. Control circuit 82 can generate control signal V12a according to compensation signal Vc to control the switching states of switch $Q_{12}$ in discharging circuit 3. For example, compensation signal Vc indicates a difference between reference voltage $V_{ref}$ and sampling signal Vs characterizing the power supply voltage signal. In addition, the control circuit is also used to control the switching states of switch $Q_0$ in power stage circuit 1, and any suitable control method can be used to control the switching states of switch $Q_0$.

Control circuit 81 can include signal generation circuit 811, comparator Comp1, and adder 812. Signal generation circuit 811 may generate signal V11 according to compensation signal Vc. The first input terminal of comparator Comp1 may receive signal V11, the second input terminal of comparator Comp1 may receive ramp signal Vr, and the output signal of comparator Comp1 can be control signal V11a when enabling signal Ven1 is active. The first input terminal of adder 812 may receive signal V11, the second input terminal of adder 812 may receive threshold voltage Vb, and the output signal of adder 812 may be control signal V1a when enabling signal Ven3 is active. For example, threshold voltage Vb can be used to raise signal V11 to control switch $Q_1$ to operate in the linear region, and threshold voltage Vb can be adjusted according to specific conditions.

When there is a piezoelectric load being driven and in the first operation interval, enabling signal Ven1 can be active.

When there is a piezoelectric load being driven and in the third operation interval, enabling signal Ven3 may be active. Signal generation circuit 811 can include integration circuit 8111 and a multiplier. Integration circuit 8111 and the multiplier may both receive compensation signal Vc, where compensation signal Vc is $V_{ref}$-Vs. Output signal Vi of integration circuit 8111 and output signal Vp of the multiplier can be superimposed to obtain signal V11.

Control circuit 82 can include signal generation circuit 821 and comparator Comp2. Signal generation circuit 821 may generate signal V12 according to compensation signal Vc. The first input terminal of comparator Comp2 may receive signal V12, the second input terminal of comparator Comp2 may receive ramp signal Vr, and the output signal of comparator Comp2 can be control signal V12a when enabling signal Ven2 is active. When there is a piezoelectric load being driven and in the second operation interval, enabling signal Ven2 can be active. Signal generation circuit 821 can include integration circuit 8111 and a multiplier. Integration circuit 8111 and the multiplier may both receive compensation signal Vc, where compensation signal Vc is Vs-$V_{ref}$. Output signal Vi of integration circuit 8111 and output signal Vp of the multiplier can be superimposed to obtain signal V12. Integration circuit 8111 can include voltage-controlled current source I1 and capacitor C11. Voltage-controlled current source I1 may receive compensation signal Vc, and can output a current to charge capacitor C11. A voltage across capacitor C11 may serve as output signal Vi of integration circuit 8111.

Figure 9:
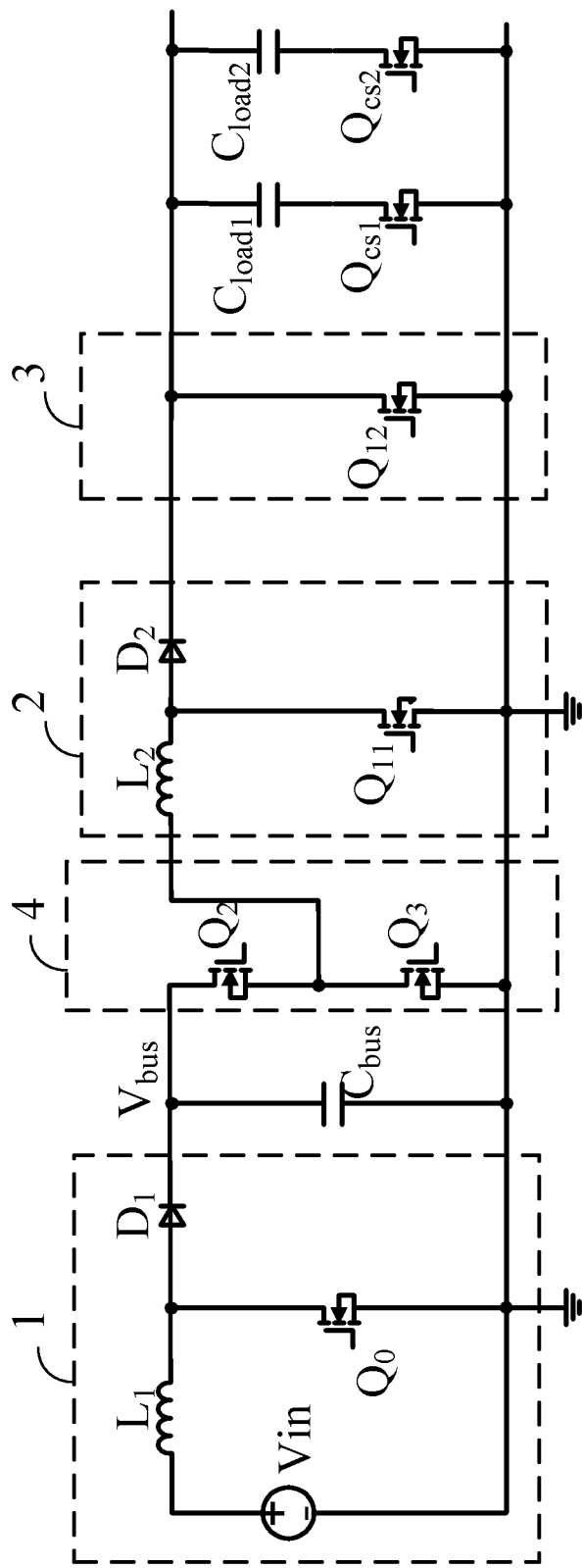
FIG. 9 is a schematic diagram of a second example of a second type of a driving circuit, in accordance with embodiments of the present invention.

Referring now to FIG. 9, shown is a schematic diagram of a second example of a second type of a driving circuit, in accordance with embodiments of the present invention. In this particular example, switching circuit 4 can include a half-bridge circuit, where the half-bridge circuit can include switches $Q_2$ and $Q_3$. Switches $Q_2$ and $Q_3$ can connect in series to form a branch, and the branch and energy-storage capacitor $C_{bus}$ can connect in parallel. In the third operation interval, the half-bridge circuit and inductor $L_2$ in power stage circuit 2 may form a buck circuit to charge the piezoelectric load, such that the power supply voltage signal corresponds to the reference voltage in the third interval. In the first operation interval, switch $Q_2$ may be turned on, switch $Q_3$ can be turned off, and power stage circuit 2 may receive voltage $V_1$ to charge the piezoelectric load, such that the power supply voltage signal corresponds to the reference voltage in the first interval. Since the half-bridge circuit needs to share the inductor in power stage circuit 2, power stage circuit 2 may need to have an inductor, and one end of the inductor is connected to the common end of second switches $Q_2$ and $Q_3$.

Figure 10:
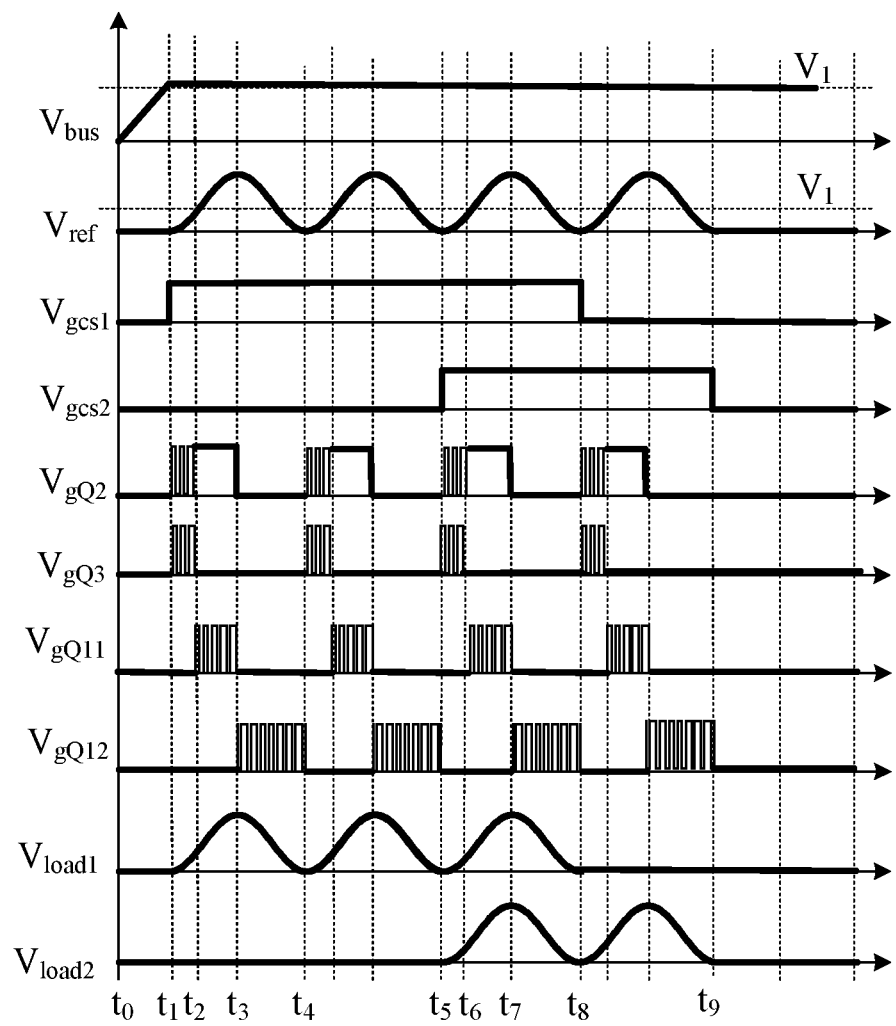
FIG. 10 is a waveform diagram of operation of the second type of the driving circuit of FIG. 9, in accordance with embodiments of the present invention.

Referring now to FIG. 10, shown is a waveform diagram of operation of the second type of the driving circuit of FIG. 9, in accordance with embodiments of the present invention. An operation process of the second type of the driving circuit according to the second embodiment is described below in conjunction with FIGS. 9 and 10. For example, $V_{bus}$ may represent the voltage on energy-storage capacitor $C_{bus}$, $V_1$ may represent the first voltage after the voltage $V_{bus}$ on energy-storage capacitor $C_{bus}$ is stabilized, and $V_{ref}$ may represent the reference voltage. A waveform of the reference voltage can be a sine wave with a trough value not less than zero. $V_{gQ2}$ may represent a driving signal for switch $Q_2$, $V_{gQ3}$ may represent a driving signal for third switch $Q_3$, $V_{gQ11}$ may represent a driving signal for switch $Q_{11}$, $V_{gQ12}$ may represent a driving signal for switch $Q_{12}$, $V_{gcs1}$ may represent a driving signal for selection switch $Q_{cs1}$, $V_{gcs2}$ may represent a driving signal for selection switch $Q_{cs2}$, $V_{load1}$ may represent a voltage difference between two ends of piezoelectric load $C_{load1}$, and $V_{load2}$ may represent a voltage difference between two ends of piezoelectric load $C_{load2}$. For example, the power supply voltage signal can be set as voltage difference $V_{load1}$ between two ends of piezoelectric load $C_{load1}$ or voltage difference $V_{load2}$ between two ends of piezoelectric load $C_{load2}$.

For driving piezoelectric load $C_{load1}$, from time $t_0$, switch $Q_0$ in power stage circuit 1 may operate in a PWM mode, such that voltage $V_{bus}$ on energy-storage capacitor $C_{bus}$ rises from zero, and until time $t_1$, voltage $V_{bus}$ on energy-storage capacitor $C_{bus}$ reaches voltage $V_1$. After that, power stage circuit 1 may still operate to stabilize voltage $V_{bus}$ on energy-storage capacitor $C_{bus}$ at voltage $V_1$. At any time after voltage $V_{bus}$ on energy-storage capacitor $C_{bus}$ stabilizes at voltage $V_1$, reference voltage $V_{ref}$ can be output, selection switch $Q_{cs1}$ or selection switch $Q_{cs2}$ can also be driven. In FIG. 10, reference voltage $V_{ref}$ may be output and selection switch $Q_{cs1}$ can be driven from time $t_1$. At time $t_1$, $V_{gcs1}$ can be at a high level and selection switch $Q_{cs1}$ may be switched on.

During time interval $t_1$-$t_2$ (corresponding to the third operation interval), the reference voltage may rise from its minimum value to the minimum value of the output voltage of power stage circuit 2. Switches $Q_2$ and $Q_3$ may operate in the PWM mode, and the half-bridge circuit and inductor $L_2$ in power stage circuit 2 may form a buck circuit. Both switch $Q_{11}$ in power stage circuit 2 and switch $Q_{12}$ in discharging circuit 3 can be turned off. The duty cycles of switches $Q_2$ and $Q_3$ in the buck circuit can be controlled, such that the power supply voltage signal increases with reference voltage $V_{ref}$ in this time interval. Voltage difference $V_{load1}$ between two ends of piezoelectric load $C_{load1}$ during this time interval can be as shown in FIG. 10.

During time interval $t_2$-$t_3$ (corresponding to the first operation interval), the reference voltage may rise from the minimum value of the output voltage of power stage circuit 2 to its maximum value. Switch $Q_2$ can be turned on, switch $Q_3$ may be turned off, switch $Q_{11}$ in power stage circuit 2 may operate in the PWM mode, and switch $Q_{12}$ in discharging circuit 3 can be turned off. During this time interval, power stage circuit 2 can charge piezoelectric load $C_{load1}$, and the duty cycle of switch $Q_{11}$ in power stage circuit 2 may be controlled, such that the power supply voltage signal increases with reference voltage $V_{ref}$ in this time interval. Voltage difference $V_{load1}$ between two ends of piezoelectric load $C_{load1}$ during this time interval may be as shown in FIG. 10.

During time interval $t_3$-$t_4$ (corresponding to the second operation interval), the reference voltage can decrease from its maximum value to its the minimum value. Switches $Q_2$ and $Q_3$ can be turned off, switch $Q_{11}$ in power stage circuit 2 may be turned off, and switch $Q_{12}$ in discharging circuit 3 may operate in the PWM mode. During this time interval, discharging circuit 3 can discharge piezoelectric load $C_{load1}$, and the duty cycle of switch $Q_{12}$ in discharging circuit 3 may be controlled, such that the power supply voltage signal decreases with reference voltage $V_{ref}$ in this time interval. Voltage difference $V_{load1}$ between two ends of piezoelectric load $C_{load1}$ during this time interval may be as shown in FIG. 10. Time interval $t_1$-$t_4$ is one operation period, and the operation process during time interval $t_1$-$t_4$ can be repeated, such that the power supply voltage signal changes with reference voltage $V_{ref}$, until time $t_8$. At time $t_8$, selection switch $Q_{cs1}$ may be turned off, such that piezoelectric load $C_{load1}$ may be disconnected from the driving circuit, and voltage difference $V_{load1}$ between two ends of piezoelectric load $C_{load1}$ can be equal to 0.

For driving piezoelectric load $C_{load2}$, during time interval $t_5$-$t_9$, $V_{gcs2}$ can be at a high level and selection switch $Q_{cs2}$ may be switched on. A waveform of voltage difference $V_{load2}$ between two ends of piezoelectric load $C_{load2}$ may be the same as the waveform of voltage difference $V_{load1}$ when piezoelectric load $C_{load1}$ is driven. In addition, the operation process of driving circuit when selection switch $Q_{cs2}$ is turned on can be the same as the operation process of driving circuit when selection switch $Q_{cs1}$ is turned on. During time interval $t_5$-$t_8$, $V_{gcs1}$ and $V_{gcs2}$ may both be at a high level, such that the two voltage output circuits are all switched on to drive piezoelectric loads $C_{load1}$ and $C_{load2}$, respectively. At time $t_9$, $V_{gcs1}$ and $V_{gcs2}$ may both be low, such that the two voltage output circuits are all switched off. Voltage difference $V_{load1}$ between two ends of piezoelectric load $C_{load1}$ can be equal to 0, and voltage difference $V_{load2}$ between two ends of piezoelectric load $C_{load2}$ can be equal to 0.

Figure 11:
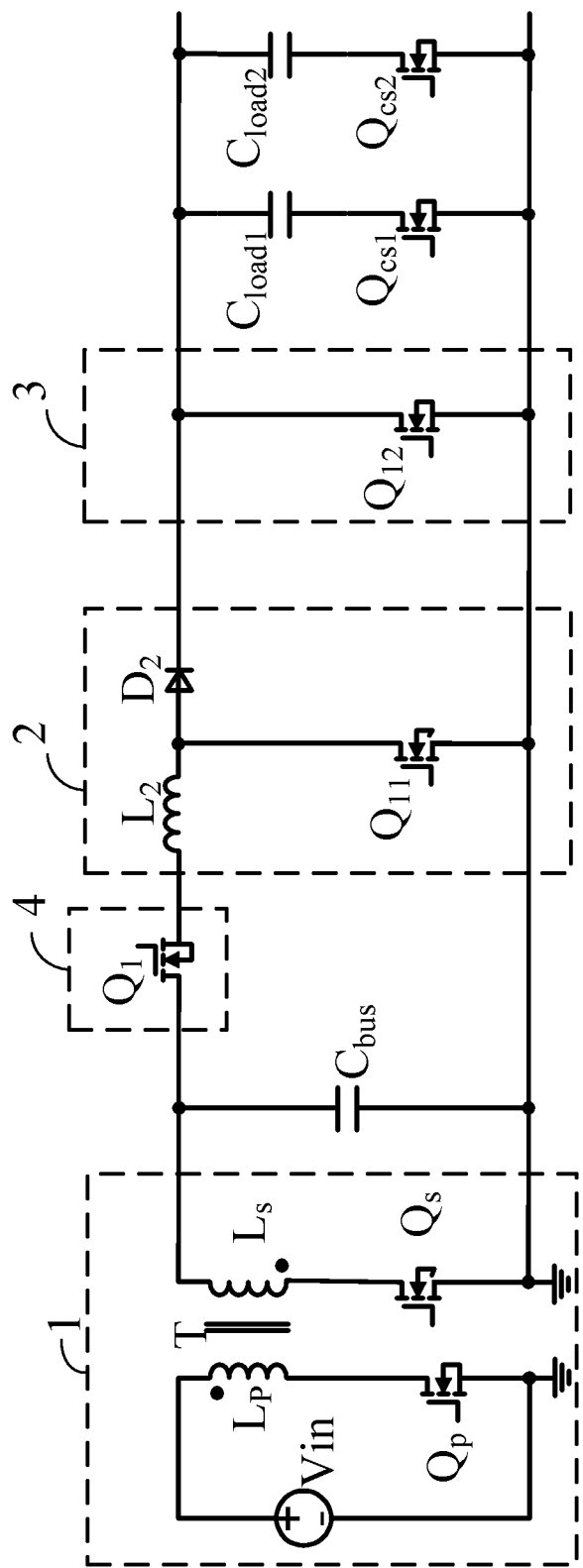
FIG. 11 is a schematic diagram of a third example of a second type of a driving circuit, in accordance with embodiments of the present invention.

Referring now to FIG. 11, shown is a schematic diagram of a third example of a second type of a driving circuit, in accordance with embodiments of the present invention. In this particular example, power stage circuit 1 can be configured as a flyback circuit. A driving method may also be provided according in particular embodiments, based on a driving circuit. The driving circuit can be used to drive one or more piezoelectric loads can include an energy-storage capacitor, a first power stage circuit, a second power stage circuit, and a discharging circuit. The driving method can include converting an input voltage into a first voltage by the first power stage circuit, where the first voltage can be stored in the energy-storage capacitor.

During a first operation interval of an operation period, the first voltage may be received by the second power stage circuit to charge the piezoelectric load, such that a power supply voltage signal provided to the piezoelectric load in the first operation interval corresponds to a reference voltage in a first interval. During a second operation interval of the operation period, the piezoelectric load can be discharged by the discharging circuit, such that the power supply voltage signal in the second operation interval corresponds to the reference voltage in a second interval. The driving circuit can also include a switching circuit coupled between the energy-storage capacitor and the second power stage circuit. During a third operation interval of the operation period, the first voltage may be received by the switching circuit to charge the piezoelectric load, such that a power supply voltage signal in the third operation interval corresponds to a reference voltage in a third interval.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A driving circuit for driving a piezoelectric load, the driving circuit comprising:
    a) an energy-storage capacitor;
    b) a first power stage circuit configured to convert an input voltage into a first voltage, and to store the first voltage in the energy-storage capacitor;
    c) a second power stage circuit configured to receive the first voltage to charge the piezoelectric load during a first operation interval of an operation period, such that a power supply voltage signal provided to the piezoelectric load in the first operation interval corresponds to a reference voltage in a first interval;
    d) a discharging circuit configured to discharge the piezoelectric load during a second operation interval of the operation period, such that the power supply voltage signal in the second operation interval corresponds to the reference voltage in a second interval; and
    e) a switching circuit coupled between the energy-storage capacitor and the second power stage circuit, wherein during a third operation interval of the operation period, the switching circuit is configured to receive the first voltage to charge the piezoelectric load, so that the power supply voltage signal in the third operation interval corresponds to the reference voltage in a third interval.

2. The driving circuit of claim 1, wherein the first power stage circuit is configured as a power stage circuit with a boost function.

3. The driving circuit of claim 1, wherein the reference voltage in the first interval corresponds to the reference voltage increasing from a first threshold to its maximum value within a period, the reference voltage in the second interval corresponds to a falling part of the reference voltage within the period, and the first threshold is equal to a minimum value of the reference voltage or a minimum value of an output voltage of the second power stage circuit.

4. The driving circuit of claim 1, wherein:
    a) during the first operation interval, the discharging circuit is controlled to be cut off, and operation states of the second power stage circuit are controlled to adjust the power supply voltage signal in the first operation interval to change with the reference voltage in the first interval; or
    b) during the second operation interval, the second power stage circuit is controlled to be cut off, and operation states of the discharging circuit are controlled to adjust the power supply voltage signal in the second operation interval to change with the reference voltage in the second interval.

5. The driving circuit of claim 1, wherein the second power stage circuit is configured as a power stage circuit with a boost function.

6. The driving circuit of claim 1, wherein during the third operation interval and the first operation interval, the discharging circuit is controlled to be cut off, the switching circuit and the second power stage circuit are controlled to operate so that the power supply voltage signal corresponds to the reference voltage in the third interval and the first interval.

7. The driving circuit of claim 1, wherein during the second operation interval, both the switching circuit and the second power stage circuit are controlled to be cut off, and the discharging circuit is controlled to operate so that the power supply voltage signal corresponds to the reference voltage in the second interval.

8. The driving circuit of claim 1, wherein during the third operation interval, the switching circuit is controlled to operate in a linear adjustment mode to charge the piezoelectric load, so that the power supply voltage signal corresponds to the reference voltage in the third interval.

9. The driving circuit of claim 1, wherein during the first operation interval, the switching circuit is controlled to operate in a fully conductive state, and the second power stage circuit is controlled to operate so that the power supply voltage signal corresponds to the reference voltage in the first interval.

10. The driving circuit of claim 1, wherein the second power stage circuit is configured as a power stage circuit with a boost function, and a minimum value of an output voltage of the second power stage circuit is greater than a minimum value of the reference voltage.

11. The driving circuit of claim 1, wherein the reference voltage in the third interval corresponds to the reference voltage increasing from its minimum value to a minimum value of an output voltage of the second power stage circuit within a period, the reference voltage in the first interval corresponds to the reference voltage increasing from the minimum value of the output voltage of the second power stage circuit to its maximum value within the period, and the reference voltage in the second interval corresponds to a falling part of the reference voltage within the period.

12. The driving circuit of claim 1, wherein a waveform of the reference voltage is a sine wave with a trough value not less than zero.

13. The driving circuit of claim 1, further comprising N voltage output circuits to drive N piezoelectric loads in one to one correspondence, wherein the N voltage output circuits are connected in parallel with each other, and for each of the N voltage output circuits:
 a) the voltage output circuit comprises a selection switch;
 b) the selection switch is connected in series with the piezoelectric load driven by the voltage output circuit; and
 c) the voltage output circuit is switched on or off by controlling switching states of the selection switch, and N is a positive integer.

14. The driving circuit of claim 1, wherein the switching circuit comprises a first switch coupled between the energy-storage capacitor and the second power stage circuit.

15. The driving circuit of claim 14, wherein:
 a) during the third operation interval, the first switch operates in a linear state, the first switch receives the first voltage, and charges the piezoelectric load through some components in the second power stage circuit, so that the power supply voltage signal corresponds to the reference voltage in the third interval; and
 b) during the first operation interval, the first switch operates in a fully conductive state, and the second power stage circuit receives the first voltage to charge the piezoelectric load, so that the power supply voltage signal corresponds to the reference voltage in the first interval.

16. The driving circuit of claim 1, wherein the switching circuit comprises a half-bridge circuit, the half-bridge circuit comprises the second switch and the third switch, the second switch and the third switch are connected in series to form a branch, and the branch and the energy-storage capacitor are connected in parallel.

17. The driving circuit of claim 16, wherein:
 a) during the third operation interval, the half-bridge circuit and an inductor in the second power stage circuit form a buck circuit to charge the piezoelectric load, so that the power supply voltage signal corresponds to the reference voltage in the third interval; and
 b) during the first operation interval, the second switch is turned on, the third switch is turned off, and the second power stage circuit receives the first voltage to charge the piezoelectric load, so that the power supply voltage signal corresponds to the reference voltage in the first interval.

18. The driving circuit of claim 1, further comprising a control circuit configured to generate a first control signal, a second control signal, and a third control signal, according to a compensation signal to control the operation states of second power stage circuit, the switching circuit, and the discharging circuit, respectively, wherein the compensation signal indicates a difference between the reference voltage and a sampling signal characterizing the power supply voltage signal.

19. The driving circuit of claim 1, wherein the discharging circuit comprises a charge pump, and a discharging switch or a branch formed by multiple discharging switches connected in parallel with each other, such that the piezoelectric load discharges electricity through the discharging circuit.

\* \* \* \* \*